(12) United States Patent
Eiffler et al.

(10) Patent No.: US 6,528,593 B1
(45) Date of Patent: Mar. 4, 2003

(54) PREPARING COPOLYMERS OF CARBOXYLIC ACID, AROMATIC VINYL COMPOUND AND HYDROPHOBIC POLYALKYLENE OXIDE

(75) Inventors: Juergen Eiffler, Stade (DE); Christoph Froehlich, Feusisberg (CH); Kerstin Stranimaier, Gross (CH)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/762,853

(22) PCT Filed: Sep. 10, 1999

(86) PCT No.: PCT/US99/20831

§ 371 (c)(1), (2), (4) Date: Feb. 14, 2001

(87) PCT Pub. No.: WO00/14133

PCT Pub. Date: Mar. 16, 2000

(51) Int. Cl.⁷ .............. C04B 7/02; C08G 65/332
(52) U.S. Cl. ...................... 525/404; 106/764
(58) Field of Search .......... 525/404; 528/421; 106/764; 524/588, 591

(56) References Cited

U.S. PATENT DOCUMENTS

| 5,138,004 A | 8/1992 | de Pierne et al. | 526/293 |
| 5,393,343 A | 2/1995 | Darwin et al. | 106/808 |

FOREIGN PATENT DOCUMENTS

| DE | 37 28 786 | 3/1989 |
| DE | 41 42 388 | 7/1992 |
| DE | 44 45 569 | 6/1995 |
| DE | 196 53 524 | 6/1998 |
| EP | 271435 A2 * | 6/1988 |
| EP | 0 306 449 | 3/1994 |
| EP | 0 736 553 | 10/1996 |
| EP | 0 612 720 | 11/1996 |
| EP | 0 753 488 | 1/1997 |
| EP | 0 792 850 | 9/1997 |
| EP | 0 850 894 | 7/1998 |
| GB | 2 221 673 | 2/1990 |
| JP | 58-51912 A * | 10/1984 |
| JP | 60-206808 | 10/1985 |
| JP | 62-187152 | 8/1987 |
| WO | WO 95/16643 | 6/1995 |
| WO | WO 97/39037 | 10/1997 |
| WO | WO 97/44288 | 11/1997 |

* cited by examiner

Primary Examiner—Robert E. L. Sellers

(57) ABSTRACT

A process for the preparation of a copolymer comprises reacting in an aqueous medium at a temperature of from 25° C. to 100° C. in the presence of from 1.0–25 weight percent based on the total weight of a), b) and c) of a free-radical initiator, a) at least one monomer selected from the group consisting of α,β-unsaturated monocarboxylic acids and their salts, α,β-unsaturated dicarboxylic acids, their half-esters free of polyoxyalkylene side chains and their salts, b) at least on olefinic monomer selected from the group consisting of aromatic vinyl compounds, vinyl ethers, vinyl esters, nitrogen-containing vinyl compounds and aliphatic olefins, and c) from 0.01 to 30 weight percent based on the total amount of a), b) and c) of at least one hydrophobic compound free of olefinic unsaturation containing units of the formula:

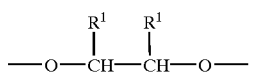

wherein $R^1$ is independently at each occurrence selected from the group consisting of hydrogen and $C_1$–$C_4$ alkyl, with the proviso that at least one $R^1$ is selected from the group consisting of $C_1$–$C_4$ alkyl.

12 Claims, No Drawings

PREPARING COPOLYMERS OF CARBOXYLIC ACID, AROMATIC VINYL COMPOUND AND HYDROPHOBIC POLYALKYLENE OXIDE

This invention relates to novel copolymers containing structural units derived from olefins, α,β-unsaturated mono- or dicarboxylic acids or derivatives thereof and a hydrophobic moiety that is incorporated into the copolymer chain, as well as to a process for preparing these hydrophobically modified copolymers. These polymers are especially useful as additives in cementitious compositions to enhance their flowability and processability. According to a second aspect, the present invention refers to the use of these copolymers as cement additives and to cementitious compositions comprising the copolymer of the present invention.

Surface-active dispersions are commonly used as additives in cementitious mixtures, for example, in mortar or concrete mixtures in order to enhance their flowability and processability. Well-known dispersions in the art are lignosulfonates, naphthalene- or formaldehyde-condensates. However, lignosulfonates show a non-satisfactory performance and naphthalene- or formaldehyde-condensates have come under environmental pressure since they contain residual toxic amounts of free formaldehyde.

Therefore, synthetic water-soluble acrylate-based superplasticizers have been introduced into the market. Among others, they are particularly produced from styrene/(meth) acrylic acid monomers. Typical products and processes for the preparation of such copolymers are disclosed in U.S. Pat. No. 5,138,004, JP-A 62-187152 ("Cement Additives", Production And Use Of Styrene/(Meth)Acrylic Acid And Styrene/Maleic-Anhydride-Copolymers), GB-A-2 221 673 (Use Of Olefin/α,βUnsaturated Dicarboxylic Acid Copolymers), and JP-A 84-62137 ("Low Molecular Weight StyrenelMaleic-Anhydride-Copolymers").

These polymers have, however, in common that they are of very hydrophilic nature due to their higher level of carboxylic acid groups in the polymer backbone. As a consequence, these polymers are very surface-active and promote an air entrainment into the cement/mortar mixtures. Usually, if no defoamers are added to the mortar, the air content can add up to 15 percent or more. The high air content negatively influences other properties of the hardened cement, such as its mechanical strength. Additionally, defoamers, which are added to reduce the air content, separate from the aqueous polymer solution within a very short time, usually within a couple of days only.

Therefore, and because of other reasons, that is, to enhance the performance of such synthetic polymers, these polymers have been modified.

EP-A-736553 discloses a copolymer composed of at least 3 different structural units a), b) and c). Structural unit a) is derived from an unsaturated dicarboxylic acid derivative or cyclic anhydrides and imides of these dicarboxylic acids. Preferred units are derived from maleic acid derivatives. The structural unit b) is derived from an oxyalkyleneglycol-alkenylether, preferably polyethylene oxide-vinyl ether, and, finally structural unit c) is derived from a monomer selected from a wide range of ethylenically unsaturated monomers. However, in general, oxyalkyleneglycol ethers are difficult to produce and they are obtained in lower yields. Therefore, these polymers are rather expensive. Furthermore, they are susceptible to hydrolysis in acidic environments that may occur during preparation of the polymers.

From DE-A-37 28 786 a copolymer comprising styrenic units and units derived from maleic anhydride esterified with a polyalkylene glycol is known wherein only esterification with polyethylene glycols is explicitly disclosed. The used polyethylene glycols still render the copolymer hydrophilic. It is further disclosed that, due to their surface-activity, these copolymers can be used as emulsifiers to improve dispersibility of cement in water. However, the high surface-activity also leads to an undesired high foam level.

EP-A-306 449 discloses copolymers of styrene and maleic acid half-esters. These copolymers are prepared by copolymerization of maleic anhydride and styrene, followed by esterification of the maleic anhydride units with polyalkylene glycols and subsequent neutralization with sodium hydroxide solution. Due to steric hindrance, a minor portion of the maleic anhydride units remains unreacted. However, according to the teaching of this reference, it is preferred to esterify as many maleic anhydride units as possible, although a 100 percent conversion, as envisaged by the teaching of this reference, is in practice, not possible. The preferred polyalkylene glycol is polyethylene glycol. These copolymers are suitable as emulsifiers and increase the flowability of cementitious compositions. It is also mentioned that these copolymers show a reduced level of air entrainment in comparison to comparable copolymers with a lower molecular weight. However, no data are disclosed to enable verification of this statement.

DE-A-41 42 388 discloses copolymers composed of random units represented by the following formula

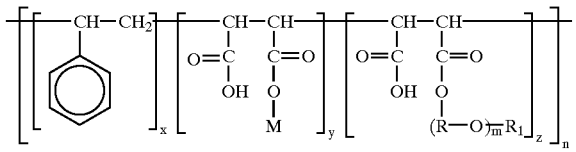

wherein M is hydrogen or the residue of a hydrophobic polyalkylene glycol, for example polypropylene glycol or of a polysiloxane; R is a $C_2$–$C_6$-alkylene residue; $R_1$ is a $C_1$–$C_{20}$-alkyl, $C_5$–$C_9$-cycloalkyl or a phenyl group; x, y and z are integers of 1 to 100; m is an integer of 1 to 100, and n is an integer of 10 to 100, wherein the ratio of x:(y+z) is from 10:1 to 1:10; the ratio of y:z is from 1:5 to 1:100, and m+n equals 15 to 100.

In a preferred embodiment, R is a $C_2$–$C_3$-alkylene group. These copolymers are useful as emulsifiers and plasticizers in cementitious compositions. It is also described that these copolymers do not have the same air entraining properties as comparable copolymers without providing any data.

DE-A-44 45 569 discloses a similar copolymer for the same purpose wherein the styrene moiety is substituted by a moiety derived from an ethylenically unsaturated monomer selected from a wide range of monomers.

In the preferred embodiments of both German applications, R is preferably ethylene, resulting in a hydrophilic polymer still showing high foam levels.

From WO 97/39037 random styrene-maleic anhydride copolymers are known. In one specific embodiment, these copolymers contain hydrophobic polyalkylene glycol and hydrophilic polyethylene glycol residues bonded to the polymeric backbone via an ester linkage.

EP-A 0 930 321 which constitutes prior art according to Article 54(3) and 54(4) EPC, discloses a copolymer comprising:
  a) structural units derived from ethylenically unsaturated hydrocarbons;
  b) structural units derived from ethylenically unsaturated monomers selected from monocarboxylic acids as well as salts and amides thereof, dicarboxylic acids as well as salts, amides and half-amides thereof and cyclic anhydrides and imides of dicarboxylic acids and mixtures thereof; and c) structural units derived from monomers selected from esters of ethylenically unsaturated monocarboxylic acids, half esters of ethylenically unsaturated dicarboxylic acids, allyl ethers and vinyl ethers and mixtures thereof having a substituent R linked to the oxygen atom of either the ester groups or the ether group that is selected from:
  (i) polyalkylene oxide groups corresponding to the formula

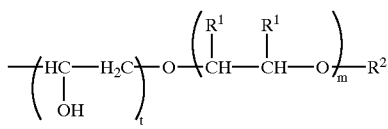

wherein $R^1$ is independently at each occurrence selected from hydrogen and $C_1$–$C_4$ alkyl, $R^2$ is $C_1$–$C_{44}$ hydrocarbyl, t is 0 or 1 and m is an integer in the range of 5–200, with the proviso that if $R^2$ is $C_1$–$C_5$ alkyl, the polyalkylene oxide group does not contain more than 50 weight percent ethylene oxide moieties, based on the weight of the polyalkylene oxide group; and (ii) groups corresponding to the formula

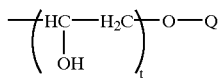

wherein t is 0 or 1 and Q is a polysiloxane residue; wherein the molar ratio of units b) to units c) in the copolymer is in the range of 1000:1 to 5:1.

The polymers described in this European Patent Application combine high plasticity of the cementitious composition with a low air entrainment due to the incorporation of certain specified hydrophobic residue wherein already a very low level of hydrophobic residues exhibits a very high efficiency in reducing the foam level of cementitious compositions. Although these copolymers show already a considerable improvement with respect to air entrainment in cementitious compositions, it was discovered that these beneficial properties may deteriorate upon storage of a dispersion containing the plasticizer for longer periods of time.

EP-A-612 702, EP-A-753 488, EP-A-792 850, EP-A-850 894, WO 97/48656, WO 95/16643, DE-A-196 53 524 and EP-A-884 290, the latter constitutes prior art according to Article 54(3) EPC, disclose copolymers composed of polyoxyalkyleneglycol(meth)acrylates and other ethylenically unsaturated monomers as additives for cementitious mixtures to improve flowability and processability. These prior art documents all exemplify polyethyleneglycol monoacrylate as polyalkylene oxide-bearing monomers. The polymers containing these monomers suffer from the disadvantages of polyalkylene oxide chains bonded via ester linkages to the polymer-backbone as discussed above and, due to the hydrophilicity of polyethylene glycol chains, these polymers additionally lead to a considerably high air entrainment into the cementitious composition comprising these additives. Thus, for example according to EP-A-753 488, commercially available defoaming agents, shown in Tables III and IV, are added to control the entrained air to be within a desired level.

U.S. Pat. No. 5,561,206 discloses a fluidity controlling mixture for cementitious compositions comprising as a cement dispersing agent, an aqueous solution of a polymer and a oxyalkylene-based defoaming agent which is either dissolved in the polymer solution or stably dispersed in this solution in particles of no more than 20 μm in diameter. To obtain these stable dispersions of defoaming agent particles (droplets) in the aqueous solution of the polymer, the polymerization of a monomer mixture comprising, in a preferred embodiment, an alkylene glycol mono(meth)acrylate acid ester monomer, a (meth)acrylic acid based monomer and, optionally, a monomer copolymerizable therewith, in the presence of a defoaming agent, is carried out. According to the teaching of U.S. Pat. No. 5,661,206, the important feature is to provide a stable dispersion of defoaming agent in an aqueous solution of a polymer wherein the defoaming agent particles or droplets have a maximum size. From this reference, it is evident that the defoaming agent is not integrated into the polymer backbone and that the reaction conditions are selected such to avoid grafting or incorporation of the defoaming agent into the polymer backbone. Consequently, the cementitious compositions containing the dispersion of this prior art reference also suffer from the problem that low air entrainment cannot be maintained upon longer storage time. This is especially true since in U.S. Pat. No. 5,661,206 a stable dispersion is defined as remaining stable for at least 24 hours, whereas in practice the polymeric additives for cementitious applications are stored for considerably longer periods prior to use.

WO 97/44288, WO 97/47566 and U.S. Pat. No. 5,393,343 all refer to acrylic polymers having polyoxyalkylene chains pendant on the polymer obtained by reacting polyoxyalkylene amines with the carboxyl functionality of either the acrylic polymer that may also contain maleic anhydride units or with the corresponding monomers prior to polymerization resulting in amide or imide bonds. The disclosed polyoxyalkylene chains are primarily composed of ethylene oxide units resulting in a high hydrophilicity of the copolymer. These references are also completely silent with respect to the incorporation of hydrophobic compounds into the polymer backbone.

EP-A-271 435 discloses a composition comprising hydraulic cement and a graft polymer plasticizer. The latter comprises a polyether backbone polymer and 2 to 30 weight percent of side chain vinyl-based polymers prepared by the polymerization of an ethylenically unsaturated monomer, preferably acrylic acid. The polyether is a polyalkylene oxide, preferably a hydroxyl terminated oxyethylene/oxypropylene copolymer. The polymerization is conducted in the presence of a free radical initiator and at a reaction temperature of 100° C. to 180° C. According to the specification of that reference, the term "graft copolymer" refers to the reaction product mixture that additionally contains by-product materials like non-grafted addition homopolymers, polyether degradation products and unreacted polyether.

Although the cementitious compositions comprising this reaction product show good plasticity, as well as low air entrainment, the process of that prior art reference as well as the products resulting therefrom have some unacceptable drawbacks. The polymers of the prior art contain a very high level of polyether, between 60 and 98 weight percent, based on the weight of the graft copolymer. Additionally, the product is very unspecified since it may contain different types of side-reaction products or unreacted products that may influence the properties of the reaction product that is used as plasticizers for cementitious compositions. As a consequence, the beneficial properties of cement plasticity at low air entrainment can only be achieved if an extremely high level of hydrophobic polyethers is used. These polyethers are very expensive raw materials. Thus, the prior art product can only be produced at an unacceptable high price. Additionally, the preparation process described in EP-A-271435 requires very high temperatures that may result in decomposition as mentioned in the specification, and in a more complicated process handling.

Thus, the objective of the present invention is to provide a new process for preparation of a plasticizer for cementitious compositions that avoids the above-described drawbacks, especially with respect to process handling and economy. It is a further objective of the present invention to provide a plasticizer for cementitious compositions showing improved plasticity as well as low air entrainment wherein these beneficial properties are not significantly reduced upon longer storage times of the plasticizer in aqueous solution or dispersion. It is a further objective of the present invention to provide a product having the above-defined benefits at low production costs.

Surprisingly, these different objectives have been attained by a process for the preparation of a copolymer containing structural units derived from α,β-unsaturated mono- or dicarboxylic acids and their salts, half-esters of dicarboxylic acids or salts thereof, an olefin and a hydrophobic moiety, said hydrophobic moiety being incorporated into the copolymer chain; said process comprises reacting in an aqueous medium a) at least one monomer selected from α,β-unsaturated mono-carboxylic acids and their salts; and α,β-unsaturated dicarboxylic acids, their half-esters free of polyalkylene oxide side chains and salts thereof;

b) at least one olefinic monomer selected from vinyl compounds selected from the group consisting of aromatic vinyl compounds, vinyl ethers, vinyl esters and nitrogen-containing vinyl compounds, and aliphatic olefins; and c) at least one hydrophobic compound free of olefinic unsaturation containing units of the formula:

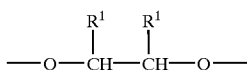

wherein $R^1$ is independently at each occurrence selected from hydrogen and $C_1$–$C_4$ alkyl, with the proviso that at least one $R^1$ is selected from $C_1$–$C_4$ alkyl in an amount of 0.01 to 30 weight percent, based on the total amount of a), b) and c); at a temperature in the range of 25° C. to 100° C., and in the presence of a free-radical initiator in an amount of 1.0 weight percent to 25 weight percent, based on the total weight of a), b) and c).

According to a further aspect, the present invention refers to a copolymer containing structural units derived from a) at least one monomer selected from α,β-unsaturated monocarboxylic acids and their salts; and α,β-unsaturated dicarboxylic acids, their half-esters free of polyalkylene oxide side chains and salts thereof;

b) at least one olefinic monomer selected from aromatic vinyl compounds and aliphatic olefins; and c) at least one hydrophobic compound free of olefinic unsaturation containing units of the formula:

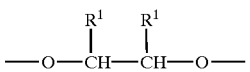

wherein $R^1$ is independently at each occurrence selected from hydrogen and $C_1$–$C_4$ alkyl, with the proviso that at least one $R^1$ is selected from $C_1$–$C_4$ alkyl in an amount of 0.01 to 25 weight percent, based on the total amount of a), b) and c), said hydrophobic moiety being incorporated into the copolymer chain, and to the use of these copolymers as plasticizer in cementitious compositions, as well as to a cementitious composition comprising this polymer.

An essential feature of the present invention is that the hydrophobic compound containing at least one oxyalkylene unit wherein alkylene is at least propylene or a higher homologue is incorporated into the copolymer chain formed by the α,β-unsaturated mono- or dicarboxylic acids or derivatives thereof and the olefinic monomer. Incorporated into the copolymer chain means, in the context of the present invention, that the hydrophobic compound is copolymerized with the ethylenically unsaturated comonomers of the present invention via a radical mechanism, thus incorporating the hydrophobic moiety via a carbon/carbon bond into the copolymer chain. The above-discussed structure of the copolymer of the present invention has been confirmed by $^{13}$C-NMR and $^1$H-NMR spectroscopy.

This is in contrast to the disclosure of U.S. Pat. No. 5,661,206 wherein the defoaming agent, although present during the polymerization step, is not grafted onto or incorporated into the polymer chain but rather remains a separate component present in the resulting dispersion. Thus, according to the teaching of U.S. Pat. No. 5,661,206, the purpose of having the hydrophobic defoaming agent present during the polymerization step is to improve the stability of the dispersion of the defoaming agent in the polymer solution.

It is believed that the hydrophobic compound is incorporated (grafted) as an end group or as a side chain into the copolymer backbone forming stable carbon/carbon linkages. It is also believed that, due to the high concentration of initiator, a proton is abstracted from an oxyalkylene unit of the hydrophobic compound wherein oxyalkylene units having secondary carbon atoms, like oxypropylene and higher homologues, are considerably more reactive, thus forming a radical on the hydrophobic compound which then copolymerizes with the olefinic comonomer, preferably styrene. The hydrophobic compound is incorporated into an olefin sequence bearing at the end (as a reactive olefin radical) a growing chain which then, of course, can also react statistically with the α,β-ethylenically unsaturated mono- or dicarboxylic acids or derivatives thereof.

It has been surprisingly found that the presence of olefinic monomers selected from aromatic vinyl compounds and aliphatic olefins is important to achieve the desired incorporation of the hydrophobic compound into the polymer backbone. If such olefinic monomers are not present and only the unsaturated component a), even in combination with other unsaturated monomers, like other acrylic monomers, is polymerized in the presence of component c), the incorporation of the hydrophobic moiety into the polymer backbone does not occur.

Another characteristic feature is that the polymerization is conducted in an aqueous medium, preferably in a mixture containing water and a low boiling alcohol. It is believed that the hydrophobic component c) acts in an aqueous medium in a first step, in particular for the hydrophobic olefinic monomer b), as a kind of emulsifier thereby forming micelles with the monomers present in the polymerization mixture. In a second step, the above-described grafting reaction may occur.

Additionally, it is assumed that the alternative route of forming radicals by abstracting hydrogen from the hydroxy groups does not take place, or if it takes place it is of less importance. This can be confirmed by the fact that the above-described reactions are preferably carried out in an aqueous solvent containing lower alcohol(s). Although the concentration of the alcohol(s) is then considerably higher than the hydroxy-functional hydrophobic compound, incorporation of the alcohol is not detected. Also, the use of polyoxyalkylene glycols having two hydroxy groups as hydrophobic compound does not lead to gelification of the composition.

In contrast to most of the prior art references where hydrophobic compounds, that is, polyoxyalkylene glycol, are incorporated into the copolymer chain via an ester linkage or an amide linkage to an unsaturated mono- or dicarboxylic acid, the hydrophobic compound of the present invention is incorporated into the molecular chain of the copolymer via stable carbon/carbon bonds. It is believed that thereby a very high stability to hydrolysis reactions, especially in basic environments, is achieved. Thus, the copolymers of the present invention are, in contrast to plasticizers wherein the hydrophobic moiety is attached via an ester linkage to the copolymer backbone, less susceptible to hydrolysis reactions and thus the beneficial properties like reduced air entrainment are maintained, even after long storage times especially in a basic environment.

Additionally, it was very surprising, especially in view of the teaching of EP-A-271 435, that the hydrophobic compounds of the present invention can be incorporated via a radical mechanism, although they are only present at a very low level compared to the teaching of EP-A-271 435, wherein the polyoxyalkylene glycol is used in considerable excess, that is, as solvent.

Thus, it is a surprising effect of the present invention that a plasticizer for cementitious compositions can be provided at considerably lower costs by reducing the amount of expensive raw material without compromising the low air entrainment. Furthermore, the plasticizers of the present invention are very stable even during a long storage period.

According to a preferred embodiment of the present invention, the hydrophobic compound to be used in the polymerization process of the present invention is selected from:

c1) polyalkylene oxide compounds corresponding to the formula:

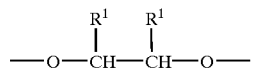

wherein $R^1$ is independently at each occurrence selected from hydrogen and $C_1$–$C_4$ alkyl, with the proviso that if ethylene oxide units are present, their content is less than 50 weight percent, based on the total weight of the polyalkylene oxide compound, $R^2$ is selected from hydrogen and from $C_1$–$C_{33}$ linear or branched, substituted or unsubstituted hydrocarbyls, and m is an integer selected such as to provide a molecular weight of the polyalkylene oxide compound in the range of 500 to 10,000, preferably 1,000 to 8,000;

c2) polyalkylene oxide compounds corresponding to the formula:

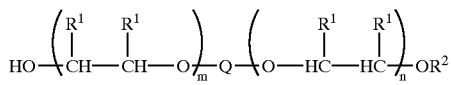

wherein $R^1$ is independently at each occurrence selected from hydrogen and $C_1$–$C_4$ alkyl, with the proviso that if ethylene oxide units are present, their content is less than 50 weight percent, based on the total weight of the polyalkylene oxide compound, Q is a divalent aromatic group, $R^2$ is selected from hydrogen and from $C_1$–$C_{33}$ linear or branched, substituted or unsubstituted hydrocarbyls and m and n are integers independently selected to provide a molecular weight of the polyalkylene oxide compound in the range of 500 to 10,000, preferably 1,000 to 8,000;

c3) polyalkylene oxide compounds according to c1) or c2) additionally containing polydiorganosiloxane blocks;

c4) polyalkylene oxide substituted alkanolamines, wherein the polyalkyleneoxide chain contains units of the formula

wherein $R^1$ is independently at each occurrence selected from hydrogen and $C_1$–$C_4$ alkyl, with the proviso that at least one $R^1$ is selected from $C_1$–$C_4$ alkyl and at least one free hydroxyl group and at least one tertiary or secondary amine group is present; and c5) polydiorganosiloxanes having at least one polyalkylene oxide chain grafted thereon, wherein the polyalkylene oxide chain contains units of the formula

wherein $R^1$ is independently at each occurrence selected from hydrogen and $C_1$–$C_4$ alkyl, with the proviso that at least one $R^1$ is selected from $C_1$–$C_4$ alkyl and at least one free hydroxyl group is present in the polydiorganosiloxane.

Preferably, the hydrophobic compound does not contain ethylene oxide units.

Particularly suitable are polyalkylene oxide substituted alkylalkanolamines selected from alkanolamines corresponding to the formula

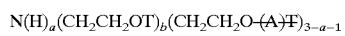

wherein A is a polyalkylene oxide moiety corresponding to the formula:

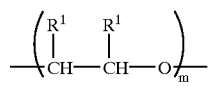

wherein $R^1$ is independently at each occurrence selected from hydrogen and $C_1$–$C_4$ alkyl, with the proviso that if ethylene oxide units are present, their content is less than 50 weight percent, based on the total weight of the polyalkylene oxide moiety, and m is an integer selected to provide a molecular weight of the polyalkylene oxide moiety in the range of 500 to 10,000, preferably 1,000 to 8,000; T is independently at each occurrence selected from hydrogen and a carbonyl moiety of the formula

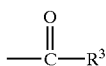

wherein $R^3$ is selected from $C_1$–$C_{30}$ hydrocarbyl, with the proviso that at least one T is hydrogen; and a and b are zero or one.

The most preferred hydrophobic compounds to be used in the process according to the present invention and to be incorporated into the copolymer of the present invention are selected from (i) poly(ethylene oxide/propylene oxide)glycols, optionally etherified at one terminal position with a $C_1$–$C_{24}$ alkyl group and containing no more than 50 weight percent, preferably no more than 15 weight percent, ethylene oxide units based on the weight of the hydrophobic compound, (ii) poly(propylene oxide)glycols, optionally etherified at a terminal position with a $C_1$–$C_{24}$ alkyl group, (iii) poly(butylene oxide)glycols, optionally etherified at one terminal position with a $C_1$–$C_{24}$ alkyl group, (iv) poly(butylene oxide/propylene oxide)glycols, optionally etherified at one terminal position with a $C_1$–$C_{24}$ alkyl group, (v) poly(ethylene oxide/butylene oxide)glycols, optionally etherified at one terminal position with a $C_1$–$C_{24}$ alkyl group and containing no more than 50 weight percent ethylene oxide units, based on the weight of the hydrophobic compound, and (vi) poly(ethylene oxide/propylene oxide/butylene oxide) glycols, optionally etherified at one terminal position with a $C_1$–$C_{24}$ alkyl group and containing no more than 50 weight percent ethylene oxide units, based on the weight of the hydrophobic compound.

Preferably, the hydrophobic compounds of the present invention are long-chain polyalkylene oxides which are known to be effective as defoamers. These compounds are preferably made from propylene oxide or butylene oxide by initiation with an alcohol such as methanol, ethanol, butanot or higher fatty alcohol or mixtures thereof. Preferred are more hydrophobic alcohols such as butanol or higher fatty alcohols. Ethylene oxides can also be used as a comonomer with propylene oxide and/or butylene oxide, however, their level should not be higher than 50 weight percent, based on the total weight of the hydrophobic compound. Examples of the polyalkylene oxide compounds used as hydrophobic compounds of the present invention are: Synalox* 25-50B, Synalox* 25-220B, Synalox* 25-300B, Synalox* 50-15B, Synalox* 50-30B, Synalox* 50-50B, Synalox* 50-100B, Synalox* 50-155B, Synalox* 50-300B, Terralox* OH28, Terralox* OH32 and Terralox* OA32 (*Trademarks of The Dow Chemical Company). These are all ethylene oxide/ propylene oxide copolymers with a maximum content of ethylene oxide units of 50 weight percent, based on the weight of the polyalkylene oxide and are commercially available from The Dow Chemical Company.

Suitable propylene oxide polymers for modifying the copolymer of the present invention are the commercial products Synalox 100-20B, Synalox 100-30B, Synalox 100-50B, Synalox 100-85B, Synalox 100-120B, Synalox 100-150B, DowFine 1000 and DF-141, all commercial products obtainable from The Dow Chemical Company.

Examples of butylene oxide polymers suitable to modify the copolymer of the present invention are the commercial products Synalox OA15, Synalox OA25, Synalox OA60, Synalox OA90, and Synalox OA185 commercially available from The Dow Chemical Company.

Other preferred compounds that can be used to modify the copolymer of the present invention are derivatives of polyalkylene oxide polymers corresponding to the formula

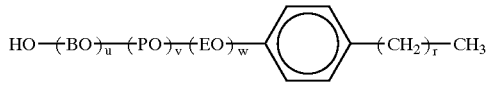

wherein EO, PO, BO represent randomly arranged ethylene oxide, propylene oxide and butylene oxide units, respectively, u, v, and w are integers from 0 to 50, with the proviso, that no more than 50 weight percent ethylene oxide units, based on the weight of R, are present and r is 0 to 35. These compounds are also commercially available from The Dow Chemical Company under the Trademark Dowfax, such as, for example Dowfax* D141 (*Trademark of The Dow Chemical Company).

These polyalkylene oxide compounds are particularly preferred since they result in copolymers according to the present invention that, if used as cement plasticizers, result in the reduction of an air entrainment in cement, mortar, and concrete.

The α,β-unsaturated monocarboxylic acids and salts thereof to be used as component a) for preparing the copolymer of the present invention are preferably selected from acrylic acid, methacrylic acid, crotonic acid and itaconic acid. Suitable α,β-unsaturated carboxylic acids are selected from maleic acid and fumaric acid, as well as their half-esters and salts thereof. The olefinic component b) is preferably selected from styrene, α-methylstyrene, ethylene, propylene, isobutylene, diisobutylene, 1-butene, 1-octene, vinyl ethers, vinyl esters, acrylonitrile, acrylamides and vinylpyrrolidone, wherein styrene is the most preferred olefinic component according to the present invention.

According to a second preferred embodiment of the present invention, at least one ethylenically unsaturated monomer d) containing polyalkylene oxide side chains is co-polymerized with components a), b) and c) as discussed above. It has been surprisingly found that the resulting copolymers are cement additives that do not, or only to a reasonable extent, retard the setting of the cement without compromising the advantageous long-term air entrainment properties of the copolymers of the present invention.

The unsaturated monomers containing the polyalkylene oxide side chains are preferably derivatives of unsaturated mono- or dicarboxylic acids such as—alkoxypolyalkylene glycol mono(meth)acrylates, half-esters or di-esters obtainable by reacting maleic anhydride with polyalkylene glycol monoethers, and half-amides obtainable by reacting maleic anhydride with polyalkylene oxide substituted alkanolamines, or adducts of allyl alcohol and alkylene oxides, and adducts of (meth)acrylamide and alkylene oxides. The number of alkylene oxide units in the monomer d) is preferably 3 to 300. These monomers contain preferably pure ethylene oxide structural units, but propylene oxide and butylene oxide and mixtures thereof may be additionally present. Preferably, their content is less than 25 weight percent, more preferably less than 10 weight percent, based on the total amount of alkylene oxide units. The most preferred monomers d) are methoxypolyethylene glycol mono-(meth)acrylates having from 7 to 30 ethylene oxide units per molecule. Mixtures of methoxypolyethylene glycol mono- (meth)acrylates with different numbers of ethylene oxide units can also be advantageously used.

According to the present invention, the hydrophobic compound is present in an amount of 0.01 to 30 weight percent in the reaction composition, based on the total weight of the monomers. Preferably, the amount of hydrophobic component c) is 0.5 to 20 weight percent, most preferably 5 to 15 weight percent, based on the total weight of monomers present. The weight ratio of monomers a:b, in case component d) is absent, is preferably within the range from 10:90 to 90:10, more preferably from 30:70 to 70:30, and most preferably about 50:50. In case component d) is present, component a) preferably is present in an amount of 0.5 to 40 weight percent, component b) preferably is present in an amount of 0.5 to 50 weight percent and component d) is present in an amount of 10 to 99 weight percent, based on the total weight of component a), b) and d).

The process according to the present invention is preferably performed in an aqueous solvent comprising an alcohol having a boiling point below 100° C.

The weight ratio alcohol/water is preferably 1:5 to 5:1, more preferably 1:3 to 3:1, and most preferably 1:2 to 2:1. Preferred alcohols are methanol, ethanol, propanol or isopropanol, but other low boiling alcohols may also be used. The most preferred low boiling alcohol is isopropanol.

The hydrophobic compound is preferably added to the alcohol/water/ethylenically unsaturated monomer mixture before the polymerization is started, that is, before the initiator is added. Also possible, but less preferred, is the continuous or portion-wise addition of the hydrophobic compound during the course of the polymerization, either separately or in a mixture with the monomer or the initiator stream.

Initiators for the free radical polymerization reactions are preferably inorganic peroxides, like peroxydisulfates such as ammonium, sodium or potassium peroxydisulfate or hydrogen peroxide and mixtures thereof. These peroxides can also be used in combination with redox-co-catalysts such as heavy metal salts, that is, Fe salts, sulfur compounds, that is, NaHS, amines or hypophosphites in order to promote their decomposition rate. In particular, if hydrogen peroxide is selected, Fe salts are advantageously used.

The use of organoperoxides such as benzoyl peroxide or azo-initiators such as azoisobutyronitrile or water-soluble azo-initiators is possible, but less preferred. For example, if azo-initiators are used, it is preferred to utilize the olefinic component b) in an amount of at least 15 weight percent, more preferred at least 20 weight percent, based on the total amount of ethylenically unsaturated monomers. Surprisingly, it has been found that a higher level of initiator than commonly used in the case of a free radical polymerization has to be used in order to enable the grafting of polyether onto the copolymer backbone. The initiator is used at the level of from 1.0 weight percent to 25 weight percent, based on the weight of the monomers, preferably in an amount of from 2.5 to 20 weight percent, most preferably 5 to 15 weight percent. If co-initiators are used, the initiator/co-initiator mole ratio can be from 1:10 to 10:1, preferably, however, the mole ratio is 1:1. In this case, the initiator level is usually somewhat lower and can be from 1 to 20 weight percent, preferably from 3 to 20 weight percent, depending on the kind of co-initiator and the polymerization conditions such as temperature applied. Preferably, no co-initiator is used, except in the case of hydrogen peroxide.

In addition, chain transfer agents to control the molecular weights of the graft copolymer can be present and include dodecylmercaptane or allyl derivatives.

The polymerization temperature is in the range of 25 to 100° C., preferably from 40 to 90° C., and most preferred in the range of 60 to 85° C. The polymerization reaction times are between 0.2 to 10 hours, preferably between 0.5 and 8 hours, most preferably from 1 to 5 hours depending on the polymerization temperature.

The low boiling alcohol is distilled from the reaction mixture after polymerization and can be recycled. Prior to distillation, the polymer can be partially or completely neutralized with diluted caustic. Instead of caustic amines such as triethanolamine or derivatives prepared from triethanolamine by conversion with propylene, ethylene or butylene oxides having one terminal amine function can be used. Ammonia solutions are less preferred. The neutralization can be conducted in such a way that caustic is added simultaneously under reflux conditions while removing the alcohol/water mixture either under vacuum or under normal pressure conditions. Preferred is, however, a process by which the neutralization is mainly performed after the removal of the alcohol/water mixture.

Although an alcohol/water mixture is most preferred, in some cases the alcohol can be replaced with an ester or ketone such as methyl or ethyl acetate or acetone. The ester and/or ketone should preferably be miscible with water and the boiling point should be below 100° C. However, as stated, an alcohol is most preferred due to its chemical stability under the reaction process conditions applied.

If an unsaturated monomer containing polyalkylene oxide chains according to component d) is used, the polymerization can also be conducted in water as the sole solvent since monomers of component d) are sufficiently water-soluble or water-dispersible and additionally enhance the dispersibility of the olefinic component. However, even if component d) is present, an alcohol/water mixture is the preferred reaction medium.

The molecular weight of the grafted copolymers are in general from 1,000 to 100,000, preferably from 3,000 to 60,000, and most preferably from 5,000 to 30,000, based on the weight average molecular weight (Mw).

The copolymers of the present invention can be used as additives, such as plasticizer, for cementitious compositions, especially those that are used for construction purposes, to increase the flowability of the cementitious composition. Especially preferred is the use of the copolymers of the present invention in mortar and cement compositions.

Thus, according to a further aspect, the present invention refers also to a cementitious composition comprising the copolymer of the present invention. These cementitious compositions for construction purposes, like mortar or cement, usually comprise a hydraulic binder, aggregate and water. According to a preferred embodiment, the copolymer of the present invention is present in these cementitious compositions in an amount of 0.001 to 2.5 weight percent, preferably 0.01 to 0.1 weight percent, based on the weight of the hydraulic binder. Preferably, the copolymer of the present invention is added to the cementitious composition in form of an aqueous solution/dispersion (concentrate) containing the copolymer in a concentration of 5 to 50 weight percent, preferably 15 to 35 weight percent.

The cementitious composition of the present invention may contain other usual additives, for instance aluminum salts like aluminum sulfate, aluminum hydroxide or aluminum hydroxysulfate as accelerators for the setting of the concrete. These and other usual additives may be either incorporated into the concentrate of the copolymer of the present invention or may be added directly to the cementitious composition.

Besides the effect of reducing the foam level in the cementitious composition, the copolymers of the present invention impart additional advantageous properties to the cementitious compositions. For example, it is known that defoamers can be added to solutions of the non-modified polymers of the prior art to reduce the high foam level of these solutions. However, all known defoaming systems tested so far, separate from the aqueous polymer solution in a couple of days and, thus, their performance is lost and the solutions exhibit the high initial foam level again. Surprisingly, it has been found that, if defoamers are added to the aqueous solutions/dispersions of the copolymers of the present invention, they do not separate even after a prolonged period of time.

The following examples are provided to illustrate the present invention in more detail and should not be construed as limiting its scope. Unless otherwise indicated, all parts and percentages are by weight.

EXAMPLE 1

49 grams (g) of maleic anhydride were slowly added into a solution of 50 g of water and 5.6 g of 50 weight percent caustic. The solution was heated to 80° C. and this temperature was kept for one hour. Then, 100 g of isopropanol, 10 g of Synalox 100-150B (The Dow Chemical Company; a polypropylene oxide glycol prepared from propylene oxide and butanol having a molecular weight of 2600) and 5 g of DowFine 1000 (The Dow Chemical Company; a polypropylene oxide glycol prepared from propylene oxide and a mixture of $C_{12}$–$C_{14}$ aliphatic alcohols having a molecular weight of 1000) and 0.1 g of dodecanthiol were added. The mixture was heated to 83° C. 55 g of styrene and a solution of 16 g of sodium peroxydisulfate in 66 milliliters (mL) of water were continuously, but separately, added over the course of one hour at 83° C. The reaction mixture was stirred for another hour at this temperature in order to allow post-polymerization. Isopropanol was evaporated and further 100 mL of water were added. The reaction mixture was allowed to cool to 55° C. and, thereafter, was neutralized with aqueous caustic and adjusted to a pH of 7.0. After dilution with water, a stable dispersion having a non-volatile content of 30 percent was obtained. Its Brookfield-viscosity was 60 centipoise (cps) (25° C.).

3.1 g of this dispersion were added to a mixture of 450 g of ordinary Portland Cement CEM and 1350 g of Normsand (0.2 mm) and 198 g of water. Hence, the water/cement ratio was 0.44. An excellent plasticity of the mortar mixture was observed (163 mm after 10 minutes). The mortar air content, as determined in accordance with DIN EN 196, was 4.5 percent. The cement mixture without the 3.1 g polymer dispersion of the invention had a flow of only 100 mm and an air content of 4.4 percent.

According to DIN EN 196, flowability was measured by compacting fresh mortar in the upside-down funnel of the apparatus and placed on the glass plate. The funnel was removed and the apparatus turned on. The glass plate moved 15 times up and down in a defined distance in brusque movements. The diameter of the mortar cake after the strokes was then recorded. The initial diameter was 100 mm, that is, the larger diameter of the funnel. Final diameters above 100 mm demonstrate the mortar exhibits a certain flowability.

A portion of the 30 weight percent aqueous polymer dispersion was put in an oven and left for 4 weeks at a temperature of 40° C. (glass sealed sample). The dispersion remained stable and did not break. 3.1 g of the thus aged dispersion were added into a fresh mortar/cement-mixture as described above. Its flow was still 162 mm after 10 minutes and its air content 4.5 percent.

In addition, the mechanical strength was determined according to DIN EN 196, by using a more sensitive mortar composition enriched with cement (Standard Test B). It was prepared by mixing 1350 g of the Normsand with 608 g of Portland Cement CEM in 292 g of water. The water/cement ratio was 0.48. The dosage of the wet copolymer was 0.3 percent with respect to the cement. The flexural strength of this mortar composition was 3.0 Newton/square millimeter ($N/mm^2$) and its compressive strength 29.8 $N/mm^2$ after 4 days. The pure mortar composition without the copolymer had a flexural strength of 3.5 $N/mm^2$ and a compressive strength of 35.8 $N/mm^2$ after 4 days respectively.

EXAMPLE 2

Example 1 was repeated exactly as described above, however, instead of a mixture of Synalox 100-150B (10 g) and DowFine 1000 (5 g), only Synalox 100-150B was used in an amount of 15 g. The polymerization was carried out as described. The aqueous solution was neutralized, adjusted to a pH of 7 and diluted to a non-volatile content of 30 weight percent. The Brookfield-viscosity of the stable turbid white dispersion was 50 cps at 25° C.

3.1 grams of this solution were added into a mortar mixture as described in Example 1. The mortar air content measured according to DIN EN 196 was determined to be 5.4 percent. The flow was 170 mm. (The mortar without the addition of the dispersion had a flow of 100 mm and an air content of 4.4 percent).

EXAMPLE 3

Example 1 was repeated, however a mixture of 10 g of Synalox* (Trademark of The Dow Chemical Company) 100-150B and 2.5 g of DowFine 1000 was used. The Brookfield-Viscosity of the neutralized stable dispersion (30 weight percent non-volatiles) was 50 cps at 25° C.

3.1 g of this dispersion were added into the mortar mixture as described in Example 1. The air-level of the mortar mixture was 4.7 percent. The flow was 164 mm after 10 minutes.

EXAMPLE 4

Example 1 was repeated, but instead of the mixture of Synalox 100-150B and DowFine 1000, an ethylene oxide/propylene oxide glycol with an EO/PO ratio of about 1:6 and a molecular weight of about 2000 to 2500 with two functional hydroxyl-end-groups was used. The polymer dispersion obtained had a pH of 7 and was diluted to a non-volatile content of 30 weight percent.

3.1 g of this dispersion were added into a mortar mixture as described in Example 1. The air content of the mortar mixture was 8.6 percent (flow of 195 mm after 10 minutes).

EXAMPLE 5

Example 1 was repeated, but instead of the mixture Synalox 100-150B and DowFine 1000, 15 g of a propylene oxide glycol with two functional OH end-groups and a molecular weight of 3000 was used (from Aldrich). The finely divided colloidal dispersion was adjusted to a pH of 7 and diluted to a non-volatile content of 30 weight percent.

3.1 g of this dispersion were added into a mortar mixture as described in Example 1. The air content of the mortar mixture was 5.1 percent (blank 5 percent) and its flow after 10 minutes was 165 mm.

EXAMPLE 6

A blend of a grafted copolymer of the invention with sodium lignosulfonate.

25 g of an aqueous 30 weight percent copolymer prepared as described in Example 1 was blended with an aqueous 30 weight percent sodium lignosultonate solution. A homogeneous solution without any skin formation was obtained.

3.1 g of this blend were added into a mortar mixture as described in Example 1. Its air content was 6.2 percent and its flow after 10 minutes was 157 mm.

EXAMPLE 7

Example 1 was repeated, however, only 2.5 g of Dowfine 1000 were used instead of the polyglycol ether mixture. The pH is adjusted to 7 (30 weight percent aqueous solution).

Mortar testing as described in Example 1 resulted in an air content of 6.8 percent and in a flow of 165 mm (blank 5 percent and 100 mm). The colloidal emulsion was stable.

EXAMPLE 8

10 g of Synalox 100-150B were added into 49 g of molten maleic anhydride and heated to 135° C. This temperature was kept for one hour. The solution was cooled to 65° C. and 50 g of water were slowly added. This temperature was kept for 20 minutes. Then, 100 g of isopropanot, 0.1 g of dodecanthiol and 2.5 g of DowFine 1000 were added. The mixture was heated to 83° C. A solution of 55 g of styrene and a sodium peroxydisulfate solution were slowly and separately added over the course of one hour. The isopropanol was removed by distillation. The solution was cooled and neutralized with caustic to a pH of 7. The solution was diluted with water to 30 weight percent. The mortar test resulted in an air content of 5.8 percent (flow of 165 ml after 10 minutes).

The solution was then put in an oven (glass sealed sample) and left for 3 months at a temperature of 40° C. The dispersion remained stable. 3.1 g of this aged solution were added into a fresh mortar/cement mixture as described. The flow of the mortar was 167 mm and its air content was 6.0 percent. The example shows that the performance of the copolymer prepared according to Example 8 was still retained after aging at 40° C. for 3 months.

EXAMPLE 9

A terpolymer of styrene, maleic acid, mixed half-esters of maleic acid with polyethylene oxide-glycolethers having molecular weights of 750 and 2000 produced in the presence of a hydrophobic polyglycolether was prepared as follows.

49 g of maleic anhydride were added to a glass reactor and heated to 60° C. 90 g of PEG 750 (a poylethylene glycol monomethylester, molecular weight of 750) and 35 g of PEG 2000 (a polyethylene glycol monomethylether, molecular weight of 2000) were added. The melt was heated to 115° C. This temperature was kept for 2 hours. Then, the reaction mixture was cooled to 50° C. and 100 g of isopropanol, 50 g of water and 13 g of PG 3000 (a polypropylene oxide-glycolether having two functional hydroxy groups) were added. The reaction solution was heated to 83° C. A solution of 55 g of styrene and a solution of 16 g of sodium peroxydisulfate dissolved in 65 mL water were added simultaneously but separately over the course of 1 hour.

The solution was heated for another 1.5 hours at 85° C. and an emulsion was obtained. 100 g of water are added and the solution was subjected to a water distillation. Isopropanol was removed via distillation. Then, the reaction solution was allowed to cool to 30° C. 55 g of a 50 weight percent caustic solution were added within 30 minutes. The solution was diluted to a non-volatile content of 35.5 weight percent. Brookfield-viscosity: 130 cps (25° C.).

3.1 g of this solution were added into a mortar mixture as described in Example 1. The air-level was 4.5 percent and the flow after 10 minutes was 168 mm.

The polymer emulsion was still stable after 4 weeks heating in an oven at a temperature of 40° C. (glass sealed sample). The flexural strength of the mortar composition according to Standard Test B) as described in Example 1 was 4.0 N/mm$^2$ and its compressive strength 29.2 N/mm$^2$ after 4 days.

EXAMPLE 10

A terpolymer composed of styrene, maleic acid and a mixed maleic half-amide in the presence of a hydrophobic polyglycolether (grafting) was prepared as follows.

49 g of maleic anhydride were reacted with a mixture of 70 g of Jeffamine 1000 (a methoxy-terminated polypropylene oxide/polyethylene oxide monoamine, available from Huntsman Chemical Corporation, having a EO/PO ratio of 19:3 and a molecular weight of 1000) and 70 g of Jeffamine 2070 (a methoxy-terminated polypropylene oxide/polyethylene oxide monoamine, having an average molecular weight of 2070) at 115° C. for 2.5 hours. The solution was cooled to 50° C. and 100 g isopropanol, 50 g water and 13 g PG 3000 were added. The mixture was heated to a temperature of 83° C.

55 g of styrene and a solution of 16 g of sodium peroxydisulfate dissolved in 65 g of water were slowly added within one hour. The reaction mixture was post-polymerized at 83° C. for another 0.5 hours. 100 g of water were added. Isopropanol was removed by a water steam distillation. The solution was allowed to cool and 56 g of a 50 weight percent caustic solution was slowly added at 30° C. 47.9 percent non-volatiles, Brookfield-viscosity: 100 cps (40 weight percent aqueous solution, 25° C.).

3.1 g of a 35 weight percent solution of this terpolymer were added into a mortar mixture as described in Example 1. Air: 4.2 percent, flow (10 Minutes): 173 mm.

A sample was put in an oven (sealed glass sample) and aged for 4 weeks at 40° C. The emulsion was still stable. The flexural strength of a mortar composition according to Standard Test B) as described in Example 1 at a dosage of 0.3 percent of this terpolymer was 3.3 N/mm$^2$ (after 48 hours) and 4.2 N/mm$^2$ (after 4 days) and its compressive strength was 24.3 N/mm$^2$ (after 48 hours) and 43.4/mm$^2$ (after 4 days). The flexural strength of the pure mortar composition without the terpolymer was 3.2 N/mm$^2$ (after 48 hours) and 3.5 N/mm$^2$ after 4 days, its compression strength 21.7 and 35.8 N/mm$^2$, respectively.

EXAMPLE 11

A terpolymer of methacrylic acid, methoxy polyethylene glycol monomethacrylate, and styrene chemically grafted with a hydrophobic polyglycolether by employing an isopropanol/water mixture as a solvent for the polymerization was prepared as follows.

A mixture of 80 g of isopropanol, 40 g of water and 8 g of PG 3000 was added to a glass reactor and heated to 85°

C. A monomer solution comprising 15.2 g of methacrylic acid, 74.8 g methoxy polyethylene glycol monomethacrylate (average molecular weight of 1100) and 10 g of styrene were added simultaneously but separately together with the initiator solution (5.4 g of sodium peroxydisulfate in 25 g of water) within 1 hour at 85° C. Then, 80 g of water were added and isopropanol was removed and recycled by a water steam distillation. The solution was allowed to cool to 30° C. and 16 g of a 30 weight percent caustic solution were slowly added. The solution was diluted to 35 weight percent and a milky white, stable emulsion was obtained. The emulsion was still stable when aged in an oven at 40° C. for 3 weeks. The pH was 6.95, and the Brookfield-viscosity 210 cps (25° C.).

3.1 g of the polymer solution were added into a mortar mixture as described in Example 1. The air content was 4.5 percent, and the flow (10 minutes) 186 mm. The test was repeated and the flexural strength of this cementitious composition was 4.73 N/mm$^2$ and its compressive strength 22.75 N/mm$^2$ after 24 hours. The pure mortar without the dispersant had a flexural strength of 3.75 N/mm$^2$ and a compressive strength of 17.3 N/mm$^2$ after 24 hours. The flexural strength of a mortar composition (Standard Test B) as described in Example 1 at a dosage of 0.3 percent (wet terpolymer) was 2.6 (after 24 hours) and 5.3 N/mm$^2$ after 4 days, its compressive strength was 9.2 (after 24 hours) and 33.2 N/mm$^2$ after 4 days.

Examples 10 and 11 demonstrate that a copolymer containing a monomer of type d) as described above does not retard setting of the cementitious composition although excellent flow levels and very low air entrainment and long-term stability are achieved.

EXAMPLE 12

A terpolymer of methacrylic acid, methoxy polyethyleneglycol methacrylate and styrene, prepared by polymerization in the presence of a hydrophobic polyglycolether (grafting) was prepared as follows.

85 g of water were heated in a glass reactor to 80° C. 1.4 g of mercaptopropionic acid and 8 g of PG 3000 were added and a turbid emulsion was obtained. 15.2 g of methacrylic acid, 74.8 g of methoxy polyethylene glycol methacrylate and 10 g of styrene were added simultaneously, but separately together with the initiator solution (15.6 g of a 10 weight percent ammonium peroxydisulfate solution) within one hour at 80° C. The temperature was then kept for another 45 minutes and 50 mL water were added in order to dilute the solution. The mixture was allowed to cool to 30° C. and 14 g of a 30 weight percent caustic solution were added within 10 minutes. The solution was diluted to a non-volatile content of 35 weight percent. A milky, white stable emulsion with a pH of 6.95 and Brookfield-viscosity of 400 cps (25° C.) was obtained.

3.1 g of this solution were added into a mortar as described in Example 1. The air content was 5.5 percent, and the flow (10 minutes) 156 mm.

A comparison of Example 12 with Example 11 shows that the use of water only instead of an isopropanol/water mixture also results in a low foaming, stable terpolymer fluidizing agent, but exhibiting a lower performance, that is, flow in mortar.

The flexural strength of a mortar composition (Standard Test B) as described in Example 1 was 1.8 N/mm$^2$ (after 24 hours) and 4.1 N/mm$^2$ after 4 days, its compressive strength after 24 hours 18.6 N/mm$^2$ and 30.7 N/mm$^2$ after 4 days.

EXAMPLE 13

A mixture of 100 g isopropanol, 50 g of water and 8 g of PG 3000 was heated to 85° C. A solution of 65 g of methoxy-polyethylene glycol monomethacrylate, 25 g of methacrylic acid and 20 g styrene and a solution of 6.5 g of 2,2-azobis(2-methylbutyronitrile) in 22 mL isopropanol were added simultaneously, but separately within one hour at 85° C. The solution was heated for an additional 3 hours at this temperature. Then, 80 g of water were added and isopropanol was removed. The solution was cooled to 30° C. 13 g of a 50 weight percent caustic solution were added within 1 minute. A turbid, stable dispersion with a pH of 7.0, non-volatiles of 32 percent and a Brookfield-viscosity of 2300 cps (25° C.) was obtained which withstood aging at 40° C. for four weeks.

COMPARATIVE EXAMPLE

Comparative Example 1

Example 1 was repeated but without the addition of any polyalkylene oxide-glycol (as claimed by this invention) during the polymerization. A clear transparent aqueous polymer solution was obtained (pH of 7, diluted to 30 percent non-volatiles). Its Brookfield viscosity was 70 cps (25° C.).

3.1 g of this solution were added to the mortar mixture and its properties were measured as described in Example 1. The air content of the mortar was 19 percent (flow after 10 minutes was 160 mm).

A comparison with Example 1 shows that only the modified polymer according to the present invention (a hydrophobic polyalkylene oxide glycol grafted onto the styrene/maleic acid copolymer) results in a low air entrainment in mortar.

When 1.5 weight percent of DowFine 1000 was post-added to the unmodified aqueous styrene/carboxylic salt copolymer, a mortar air content of 6.8 percent was obtained. However, the post-added defoamer separated almost completely into the upper phase after 2 days standing. This clearly shows that only the partial incorporation of the defoamer into the polymer backbone by a grafting reaction according to the invention results in a stable dispersion.

Comparative Example 2

Example 1 was repeated, however instead of Synalox 100-150B and DowFine 1000, Dow MPEG 500 (a polyethylene oxide-glycol made from ethylene oxide and methanol having a molecular weight of 500) (15 g) was used and added into the monomer mixture before the polymerization. A clear transparent polymer solution was obtained having a Brookfield viscosity of 30 cps, a pH of 7, and 30 percent non-volatiles at 25° C. The air content of the mortar mixture was measured as described in Example 1 and was 18.3 percent.

A comparison with Example 1 shows that an EO-based polyglycol grafted onto he polycarboxylate is not useful in order to reduce the air entrainment.

Comparative Example 3

Example 1 was repeated, however instead of the polyglycol ether mixture, 12.5 g of a lower molecular weight silicon oil (Wacker L051) were used. A stable, turbid emulsion (dispersion) was obtained indicating that a grafting took place. The aqueous polymer solution was diluted to 30 weight percent and adjusted to a pH of 7. The mortar test as described in Example 1 resulted in an air content of 24 percent.

This Comparative Example shows that lower molecular weight silicon oils having two functional end groups are too hydrophilic in order to suppress the air content in mortar.

Comparative Example 4

Example 1 was repeated, however instead of the polyether glycol mixture of the invention, 10 g of a higher aliphatic alcohol (decanol) were used. The solution was diluted to 30 weight percent and the pH adjusted to 7. The solution separated after 2 days standing into 2 phases with precipitates forming at the walls of the vessel.

This Comparative Example shows that the use of a higher hydrophobic aliphatic polyalcohol does not result in a stable finely divided colloidal emulsion (dispersion).

Comparative Example 5

This example refers to polymerization of acrylic acid only (absence of styrene or an olefin) in aqueous solution in the presence of hydrophobic polyoxyalkylene glycols.

8 g of Synalox 100-150B and 5 g of DowFine 1000 were added into 200 g of water. The dispersion was vigorously stirred and heated to 83° C. 73 g of acrylic acid and a solution of 16 g of sodium peroxydisulfate dissolved in 66 mL water were added simultaneously, but separately over the course of 2 hours at 83° C. The solution was allowed to stir for an additional 4 hours at this temperature. Then, the reaction mixture was allowed to cool to 45° C. A solution of 85 g of a 50 weight percent caustic solution was added within 20 minutes so that the temperature did not exceed 60° C. The pH of the solution was 7.0, the non-volatile content 30.4 percent.

After one day, the dispersion separated into 2 layers, the upper layer containing the polyoxyalkylene glycol.

Comparative Example 6

Comparative Example 5 was repeated using different polymerization conditions.

8 g of Synalox 100-150B and 5 g of DowFine 1000 were added into 100 g of water. The dispersion was vigorously stirred and heated to 83° C. 73 g of acrylic acid and a solution of 16 g of sodium peroxydisulfate dissolved in 66 mL water were simultaneously but separately added within 1 hour at 83° C. The solution was allowed to stir for another 40 minutes until gelification occurred. 50 mL of water were additionally brought into the reactor and the solution cooled to 50° C. A solution of 75 g of a 50 weight percent caustic solution was slowly added. Then, an additional 100 mL of water. The polymer did not completely dissolve in water and larger amounts of gelled particles were present. The non-reacted polyoxyalkylene glycol separated in an upper phase.

Comparative Example 7

This example refers to the polymerization of acrylic acid and maleic acid (mole ratio of 1:1, no styrene nor another olefin present) in aqueous solution in the presence of a hydrophobic poiyoxyalkylene oxide.

49 g of maleic anhydride were slowly added into a solution of 50 g of water containing 5.6 g of caustic. Then, 0.1 g of dodecanthiol, 8 g of Synalox 100-150B and 5 g of DowFine were added. The solution was heated to 83° C. At this temperature, 36 g of acrylic acid and a solution of 16 g of sodium peroxydisulfate were simultaneously but separately added during the course of 1 hour. The solution was allowed to stir for another 2 hours, cooled to 50° C. 131 g of a 50 weight percent caustic solution were added. The solution became deep yellow. The hydrophobic polyoxyalkylene oxides separated directly after the synthesis into the upper phase. The lower phase consisted of the transparent polymer solution which was yellow colored.

Comparative Examples 5 to 7 show that the polyalkylene oxide glycols could not be grafted during conditions of synthesis to the polyacrylic acid backbone, in contrast to the styrene/methacrylate (S/MA) copolymer (in general: an olefin/unsaturated carboxylic acid (dicarboxylic acid) copolymer of the invention. Hence, the air content of a mortar/water dispersion containing the polyacrylic acid is high (higher than 15 percent) and can not be reduced to a level of 5 percent as in the case of the S/MA copolymer of the invention. Thus, it is believed that the presence of the olefinic component b) according to the present invention is essential to achieve grafting of the hydrophobic compound to the polymer backbone if the hydrophobic compound is reacted at low amounts and low temperatures.

Comparative Example 8

The procedure of Example 8 was repeated, but DowFine 1000 was not added during the polymerization. The solution was less turbid (pH of 7.3). The air content of the mortar mixture was 7.2 percent (flow of 174 mm after 10 minutes). 0.5 weight percent of DowFine 1000 was post-added into the solution. The dispersion was stable and imparted to the mortar an air content of 5.7 percent (166 mL flow). The dispersion was stored for one month at 40° C. and was still stable, but it now imparted to the mortar an air content of 7.8 percent (blank 4.8 percent).

Comparing Example 8 with Comparative Example 8 shows that the presence of the hydrophobic polyglycol during the polymerization and its grafting onto the copolymer containing a half-ester of the polyglycol results surprisingly in a product of still superior performance.

Comparative Example 9a

Example 9 was repeated, but without PG 3000 during the polymerization. The Brookfield-viscosity of the 37.4 percent aqueous solution at 25° C. was 110 cps.

3.1 g of the 35 weight percent aqueous solution were added into a mortar mixture as described in Example 1. The air level was 18.5 percent, and the flow (10 minutes) 180 mm. The sample had an unacceptable high air level. 1 g of PG 3000 was dispersed into 50 g of this solution. The post-added hydrophobic polyglycolether partly separated after 5 days standing at ambient temperatures and after 2 days when aged in an oven at 40° C.

Comparative Example 9b

A copolymer of acrylic acid and mixed half-esters of maleic acid with polyethylene glycolethers having molecular weights of 750 and 2000 only (without styrene) were prepared as follows.

15 g of maleic anhydride were reacted with 80 g of PEG 750 and 40 g of PEG 2000 for 2 hours at 115° C. Then, the solution was cooled to 85° C. and 100 g of water were added. 36 g of acrylic acid and a solution of 16 g of sodium peroxydisulfate dissolved in 65 mL water were simultaneously but separately added within 1 hour at 83° C. The solution was heated for another hour at 83° C. The reaction mixture was allowed to cool to 30° C. and 88 g of a 30 weight percent caustic solution were slowly added within 25 minutes. The non-volatile content was 45.9 percent. The solution was diluted to 40 weight percent—and its Brookfield-viscosity was 90 cps (25° C.).

3.1 grams of a 35 weight percent aqueous polymer solution were added into a mortar mixture as described by Example 1. The air content was 6.8 percent, and the flow after 10 minutes 158 mm.

The Comparative Example 9b) shows that the use of a polymeric acrylic acid/half-ester composition only results in a higher air content and in a lower fluidity of the mortar mixture when compared to Example 9 according to the present invention.

Comparative Example 9c

Comparative Example 9b was repeated, however in the presence of a hydrophobic polyglycol (PG 3000, 13 g). The emulsion was not stable and completely separated in 2 phases after only one day standing at ambient temperature. The hydrophobic polyglycol ether is in the upper phase. This Comparative Example shows that the presence of an olefin such as styrene is essential in order to achieve a grafting reaction.

Comparative Example 10

A terpolymer was prepared according to Example 10, however PG 3000 was not used. The non-volatiles content was 49.2 percent and the Brookfield-viscosity 75 cps (40 weight percent aqueous solution, 25° C.).

The solution was diluted to 35 weight percent and 3.1 g were added into a mortar mixture as described in Example 1. The air content was 23 percent, and the flow (10 minutes) 210 mm.

1 g PG 3000 was dispersed (post-added) into 50 g of the 35 weight percent polymer solution. The solution was aged in an oven at 40° C. (sealed glass sample). After 3 days, the emulsion was not homogeneous any more and PG 3000 separated from the polymer solution.

Comparative Example 11a

A copolymer of methacrylic acid and methoxy polyethyleneglycol monomethacrylate according to EP-0 753 488, Example 4, was prepared as follows.

85 g of water were added to a glass reactor and heated to 80° C. A monomer solution A) comprising 10.2 g of methacrylic acid, 25 g of water, 0.835 g mercaptopropionic acid and 89.9 g of methoxy-polyethylene glycolether (average molecular weight of 1100) and a solution B) comprising the initiator, 0.92 g ammonium peroxydisulfate dissolved in 9.2 g water, were slowly added within 4 hours. Then, 2.3 g of a 10 weight percent ammonium peroxydisulfate solution were dropped into the solution at this temperature. The viscous mixture was further heated at 80° C. for another hour.

The solution was cooled to 30° C. and 15 g of a 30 weight percent caustic solution was slowly added. The solution was diluted to a non-volatile content of 35 percent. In contrast to Example 11, a clear, slightly yellow, transparent solution was obtained having a pH of 7, and a Brookfield-viscosity of 75 cps (25° C.).

3.1 grams of the solution were added into a mortar mixture as described in Example 1. The air content was 7.4 percent, and the flow (10 minutes) 172 mm. Thus, Comparative Example 11 imparted to the mortar mixture a higher air content combined with a lower flow when compared to Example 11 of the invention.

1 g of PG 3000 was dispersed in 50 g of the polymer solution and put into an oven (glass sealed sample). After 2 days, the solution was not stable any more and separation of the hydrophobic polyglycolether started to occur.

Comparative Example 11b

A terpolymer of methacrylic acid, methoxy-polyethylene glycol monomethacrylate and styrene, produced in aqueous solution according to EP-0 753 488 without the use of a hydrophobic polyglycolether was prepared as follows.

85 g of water were added to a reactor. The solution was heated to 80° C., and a solution comprising a mixture of 15.2 g methacrylic acid, 74.8 g of methoxy polyethylene glycol monomethacrylate, 10 g of styrene and 1.4 g of mercaptopropionic acid was added slowly together with an initiator solution (15.6 g of a 10 weight percent ammonium peroxydisulfate solution) within 4 hours at 80° C. Then, a solution of 3 g of a 10 weight percent ammonium peroxydisulfate was dropped into the reaction mixture within an hour. This temperature was kept for another hour. Meanwhile, 85 mL of water were added in order to dilute the solution. The reaction mixture was allowed to cool to 30° C. and 15 g of a 30 weight percent caustic solution were slowly added. The solution was diluted to 35 weight percent. A clear, transparent, slightly pale yellow solution was obtained having a pH of 6.95, and a Brookfield-viscosity of 850 cps (25° C.).

Comparative Example 11b) shows that an unfavorably high viscosity is obtained when the terpolymer is produced with styrene using an aqueous solution instead of an isopropanol/water mixture.

3.1 g of this solution were added into the mortar mixture as described in Example 1. The air content was 25 percent, and the flow: 210 mm. Comparative Example 11b) shows that the terpolymer imparts the mortar mixture a high air content.

Comparative Example 11c

Preparation of a copolymer of methacrylic acid and methoxy polyethylene glycol monomethacrylate in the presence of a hydrophobic polyglycol.

Comparative Example 11a) was repeated, however 8.5 g of a hydrophobic propyleneglycol (PG 3000) was present during the polymerization as described in Example 11 of the invention. After only one day standing, the emulsion completely broke and separated into 2 phases. The small, upper phase contained the hydrophobic, polypropylene glycolether.

Comparative Example 11c) shows that a grafting of the hydrophobic propylene glycol onto the methacrylic acid/ acrylate polymer alone does not take place without an olefinic component such as styrene.

Comparative Example 11d 85 g of water were added to a glass reactor and heated to 80° C. 8 g of PG 3000 were added. A solution of 10.2 g of methacrylic acid, 89.9 g of methoxy polyethylene glycol monomethacrylate (molecular weight of 1100) and 0.835 g mercaptopropionic acid was added simultaneously but separately together with the initiator solution (0.8 g of 2,2-azo (2-methylbutyronitrile) dissolved in 5 g of isopropanol) within 4 hours. Then, a solution of 0.3 g of 2,2-azo(2-methylbutyronitrile) dissolved in 5 g of isopropanol was dropped in the reaction solution within a further hour. 85 g of water were added in order to dilute the solution. The reaction mixture was cooled to 30° C. and 11 g of a 30 weight percent caustic solution were slowly added. The solution was not homogeneously turbid and separated after one day standing into 2 phases. The upper one was an oily layer which contains the hydrophobic polyetherglycol. This Comparative Example clearly shows that the grafting of the hydrophobic polyglycol does not occur in the absence of an unsaturated olefinic monomer such as styrene.

What is claimed is:

1. Process for the preparation of a copolymer containing structural units derived from a) at least one monomer selected from the group consisting of α,β-unsaturated mono-carboxylic acids and their salts; and α,β-unsaturated dicarboxylic acids, their half-esters free of polyalkylene oxide side chains and salts thereof, b) an aromatic vinyl compound and c) a hydrophobic moiety, said hydrophobic moiety being incorporated into the copolymer chain;

said process comprises reacting, in an aqueous medium,
a) at least one monomer selected from the group consisting of α,β-unsaturated mono-carboxylic acids and their salts; and α,β-unsaturated dicarboxylic acids, their half-esters free of polyalkylene oxide side chains and salts thereof;
b) at least one aromatic vinyl compound; and
c) at least one hydrophobic compound free of olefinic unsaturation containing units of the formula:

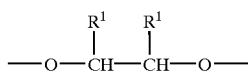

wherein $R^1$ is independently at each occurrence selected from hydrogen and $C_1$-$C_4$ alkyl, with the proviso that at least one $R^1$ is selected from the group consisting of $C_1$-$C_4$ alkyl, the hydrophobic compound(s) c) being present in an amount of 0.01 to 30 weight percent, based on the total amount of a), b) and c);

at a temperature in the range of 25° C. to 100° C., and in the presence of a free-radical initiator in an amount of 1.0 weight percent to 25 weight percent, based on the total weight of a), b) and c).

2. The process according to claim 1, wherein the hydrophobic compound is selected from the group consisting of c1) polyalkylene oxide compounds corresponding to the formula:

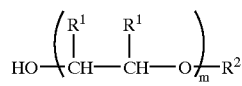

wherein $R^1$ is independently at each occurrence selected from the group consisting of hydrogen and $C_1$-$C_4$ alkyl, with the proviso that if ethylene oxide units are present, their content is less than 50 weight percent, based on the total weight of the polyalkylene oxide compound, $R^2$ is selected from the group consisting of hydrogen and from $C_1$-$C_{33}$ linear or branched, substituted or unsubstituted hydrocarbyls, and m is an integer selected to provide a molecular weight of the polyalkylene oxide compound in the range of 500 to 10,000;

c2) polyalkylene oxide compounds corresponding to the formula:

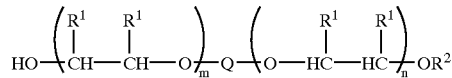

wherein $R^1$ is independently at each occurrence selected from the group consisting of hydrogen and $C_1$-$C_4$ alkyl, with the proviso that if ethylene oxide units are present, their content is less than 50 weight percent, based on the total weight of the polyalkylene oxide compound, Q is a divalent aromatic group, $R^2$ is selected from the group consisting of hydrogen and from $C_1$-$C_{33}$ linear or branched, substituted or unsubstituted hydrocarbyls and m and n are integers independently selected to provide a molecular weight of the polyalkylene oxide compound in the range of 500 to 10,000;

c3) polyalkylene oxide compounds according to c1) or c2) additionally containing polydiorganosiloxane blocks;

c4) polyalkylene oxide substituted alkanolamines, wherein the polyalkylene oxide chain contains units of the formula

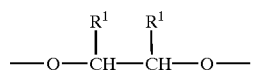

wherein $R^1$ is independently at each occurrence selected from the group consisting of hydrogen and $C_1$-$C_4$ alkyl, with the proviso that at least one $R^1$ is selected from $C_1$-$C_4$ alkyl and at least one free hydroxyl group and at least one tertiary or secondary amine group is present and that if ethylene oxide units are present, their content is less than 50 weight percent, based on the polyalkylene oxide chain; and c5) polydiorganosiloxanes having at least one polyalkylene oxide chain grafted thereon, wherein the polyalkylene oxide chain contains units of the formula

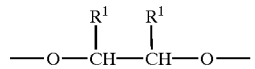

wherein $R^1$ is independently at each occurrence selected from the group consisting of hydrogen and $C_1$-$C_4$ alkyl, with the proviso that at least one $R^1$ is selected from $C_1$-$C_4$ alkyl and at least one free hydroxyl group is present in the polydiorganosiloxane.

3. The process according to claim 2, wherein the polyalkylene oxide substituted alkanolamines are selected from the group consisting of alkanolamines corresponding to the formula:

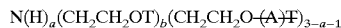

wherein A is a polyalkylene oxide moiety corresponding to the formula:

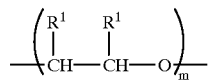

wherein $R^1$ is independently at each occurrence selected from the group consisting of hydrogen and $C_1$-$C_4$ alkyl, with the proviso that if ethylene oxide units are present, their content is less than 50 weight percent, based on the total weight of the polyalkylene oxide moiety, and m is an integer selected to provide a molecular weight of the polyalkylene oxide moiety in the range of 500 to 10,000; T is independently at each occurrence selected from the group consisting of hydrogen and a carbonyl moiety of the formula

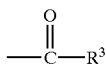

wherein $R^3$ is selected from $C_1$–$C_{30}$ hydrocarbyl, with the proviso that at least one T is hydrogen; and a and b are zero or one.

4. The process according to claim 2, wherein the hydrophobic compound is selected from the group consisting of
(i) poly(ethylene oxide/propylene oxide)glycols optionally etherified at one terminal position with a $C_1$–$C_{24}$ alkyl group and containing no more than 50 weight percent ethylene oxide units, based on the weight of the hydrophobic compound,
(ii) poly(propylene oxide)glycols optionally etherified at a terminal position with a $C_1$–$C_{24}$ alkyl group,
(iii) poly(butylene oxide)glycols optionally etherified at one terminal position with a $C_1$–$C_{24}$ alkyl group,
(iv) poly(butylene oxide/propylene oxide)glycols optionally etherified at one terminal position with a $C_1$–$C_{24}$ alkyl group
(v) poly(ethylene oxide/butylene oxide)glycols optionally etherified at one terminal position with a $C_1$–$C_{24}$ alkyl group and containing no more than 50 weight percent ethylene oxide units, based on the weight of the hydrophobic compound, and
(vi) poly(ethylene oxide/propylene oxide/butylene oxide) glycols optionally etherified at one terminal position with a $C_1$–$C_{24}$ alkyl group and containing no more than 50 weight percent ethylene oxide units, based on the weight of the hydrophobic compound.

5. The process according to claim 1, wherein the α,β-unsaturated monocarboxylic acids are selected from the group consisting of acrylic acid, methacrylic acid, crotonic acid and itaconic acid; and the α,β-unsaturated dicarboxylic acids are selected from the group consisting of maleic acid and fumaric acid.

6. The process according to claim 1, wherein the aromatic vinyl compound b) is selected from the group consisting of styrene and α-methylstyrene.

7. The process according to claim 1, wherein the process is performed in an aqueous solvent comprising an alcohol having a boiling point below 100° C. and wherein the weight ratio alcohol/water is 1:5 to 5:1.

8. The process according to claim 1, wherein the free-radical initiator is selected from the group consisting of inorganic peroxides and redox-initiators.

9. The process according to claim 1, wherein the initiator is present in an amount of 2.5 to 20 weight percent, based on the total amount of monomers.

10. A copolymer containing structural units derived from
a) at least one monomer selected from the group consisting of α,β-unsaturated mono-carboxylic acids and their salts; and α,β-unsaturated dicarboxylic acids, their half-esters free of polyalkylene oxide side chains and salts thereof;
b) at least one aromatic vinyl compound; and
c) at least one hydrophobic compound free of olefinic unsaturation containing units of the formula:

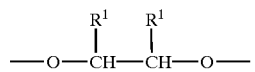

wherein $R^1$ is independently at each occurrence selected from the group consisting of hydrogen and $C_1$–$C_4$ alkyl, with the proviso that at least one $R^1$ is selected from the group consisting of $C_1$–$C_4$ alkyl,
the hydrophobic compound(s) c) being present in an amount of 0.01 to 25 weight percent, based. on the total amount of a), b) and c), said hydrophobic moiety being incorporated into the copolymer chain.

11. A cementitious composition comprising a copolymer as defined in claim 10.

12. A copolymer according to claim 10, wherein the α,β-unsaturated mono-carboxylic acids are selected from the group consisting of acrylic acid, methacrylic acid, crotonic acid and itaconic acid; and the α,β-unsaturated dicarboxylic acids are selected from the group consisting of maleic acid and fumaric acid and wherein the component b) is selected from the group consisting of styrene and α-methylstyrene.

* * * * *

UNITED STATES PATENT AND TRADEMARK OFFICE
CERTIFICATE OF CORRECTION

PATENT NO. : 6,528,593 B1
DATED : March 4, 2003
INVENTOR(S) : Juergen Eiffler, Christoph Froehlich and Kerstin Stranimaier It is certified that error appears in the above-identified patent and that said Letters Patent is hereby corrected as shown below:

<u>Title page, Item [54] and Column 1, lines 1-4,</u>
Title, delete "PREPARING COPOLYMERS OF CARBOXYLIC ACID, AROMATIC VINYL COMPOUND AND HYDROPHOBIC POLYALKYLENE OXIDE" and insert therefore -- PROCESS FOR PREPARING HYDROPHOBICALLY MODIFIED LOW FOAMING COPOLYMERS, HYDROPHOBICALLY MODIFIED LOW FOAMING COPOLYMERS AND THEIR USE AS CEMENT ADDITIVES --.

Signed and Sealed this

Twenty-sixth Day of August, 2003

JAMES E. ROGAN
*Director of the United States Patent and Trademark Office*